United States Patent
Jung et al.

(10) Patent No.: US 10,327,111 B2
(45) Date of Patent: Jun. 18, 2019

(54) MBMS OPERATION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Youngdae Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/523,345

(22) PCT Filed: Oct. 30, 2015

(86) PCT No.: PCT/KR2015/011604
§ 371 (c)(1),
(2) Date: Apr. 28, 2017

(87) PCT Pub. No.: WO2016/068662
PCT Pub. Date: May 6, 2016

(65) Prior Publication Data
US 2017/0245121 A1 Aug. 24, 2017

Related U.S. Application Data

(60) Provisional application No. 62/072,449, filed on Oct. 30, 2014.

(51) Int. Cl.
*H04W 4/00* (2018.01)
*H04W 4/06* (2009.01)
(Continued)

(52) U.S. Cl.
CPC ............ *H04W 4/06* (2013.01); *H04W 24/10* (2013.01); *H04W 48/08* (2013.01); *H04W 48/20* (2013.01); *H04L 12/189* (2013.01)

(58) Field of Classification Search
None
See application file for complete search history.

(56) References Cited

U.S. PATENT DOCUMENTS

| | | | |
|---|---|---|---|
| 8,224,324 B2* | 7/2012 | Proctor | H04W 36/0055 455/435.2 |
| 2005/0090278 A1* | 4/2005 | Jeong | H04W 36/0055 455/525 |

(Continued)

FOREIGN PATENT DOCUMENTS

| KR | 1020070025757 | 3/2007 |
|---|---|---|
| KR | 1020090090311 | 8/2009 |

(Continued)

OTHER PUBLICATIONS

Ericsson, "Clarification of MCCH to MCH mapping", R2-144488, 3GPP TSG RAN WG1 Meeting #87bis, Oct. 2014, 6 pages.

(Continued)

*Primary Examiner* — Bob A Phunkulh
(74) *Attorney, Agent, or Firm* — Lee Hong Degerman Kang Waimey

(57) ABSTRACT

The present invention provides a multimedia broadcast/multicast service (MBMS) operation method performed by a terminal in a wireless communication system, the method comprising the steps of: receiving at least one MBMS cell list from a network; receiving an offset from a network; and applying the offset to a plurality of cells included in the MBMS cell list so as to perform estimation for mobility, (Continued)

wherein the MBMS cell list includes information on MBMS services provided by the plurality of cells included in the MBMS cell list.

13 Claims, 17 Drawing Sheets

(51) Int. Cl.
| | | |
|---|---|---|
| *H04W 24/10* | (2009.01) | |
| *H04W 48/08* | (2009.01) | |
| *H04W 48/20* | (2009.01) | |
| *H04L 12/18* | (2006.01) | |

(56) References Cited

U.S. PATENT DOCUMENTS

| | | | |
|---|---|---|---|
| 2006/0146745 A1* | 7/2006 | Cai | H04L 12/1881 370/328 |
| 2009/0011757 A1* | 1/2009 | Tenny | H04W 36/30 455/425 |
| 2010/0008323 A1* | 1/2010 | Deshpande | H04W 48/12 370/331 |
| 2010/0130202 A1* | 5/2010 | Yu | H04W 48/16 455/434 |
| 2011/0281615 A1* | 11/2011 | Yamada | H04W 36/0094 455/524 |
| 2011/0317577 A1* | 12/2011 | Yamada | H04W 24/10 370/252 |
| 2013/0039250 A1* | 2/2013 | Hsu | H04H 20/71 370/312 |
| 2014/0204894 A1* | 7/2014 | Chang | H04W 4/06 370/329 |
| 2017/0171786 A1* | 6/2017 | Mochizuki | H04W 36/0083 |

FOREIGN PATENT DOCUMENTS

| | | |
|---|---|---|
| WO | 2013055071 | 4/2013 |
| WO | 2013151360 | 10/2013 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.

3rd Generation Partnership Project (3GPP), "Technical Specification Group Radio Access Network; Evolved Universal Terrestrial Radio Access (E-UTRA); Radio Resource Control (RRC); Protocol specification (Release 8)," 3GPP TS 36.331 V8.0.0, Dec. 2007, 56 pages.

* cited by examiner

MBMS OPERATION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2015/011604, filed on Oct. 30, 2015, which claims the benefit of U.S. Provisional Application No. 62/072,449, filed on Oct. 30, 2014, the contents of which are all hereby incorporated by reference herein in its entirety.

BACKGROUND OF THE INVENTION

Field of the Invention

The present invention relates to wireless communication and, more particularly, to a MBMS operation method performed by a UE in a wireless communication system and the UE using the method.

Related Art

Standardization works of international mobile telecommunication (IMT)-advanced which is a next generation (i.e., post 3rd generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

3rd generation partnership project (3GPP) prepares LTE-Advanced (LTE-A) which is an improved version of long term evolution (LTE) based on orthogonal frequency division multiple access (OFDMA)/single carrier-frequency division multiple access (SC-FDMA) transmission as a system standard satisfying requirements of the IMT-advanced. The LTE-A is one of promising candidates for the IMT-advanced.

Multimedia Broadcast/Multicast Service (MBMS) is a service for simultaneously transmitting data packets to a plurality of users, similar to existing CBS (Cell Broadcast Service). However, the CBS is a low-speed message-based service, but MBMS is aimed at high-speed multimedia data transmission. Also, there is a difference that CBS is not based on IP (internet protocol) but MBMS is based on the IP multicast. According to the MBMS, when a certain level of users exist in the same cell, since users may receive the same multimedia data using a shared resource (or channel), the efficiency of radio resources is increased, and thus users may use the multimedia service cheaply.

The MBMS uses a common channel in order to allow a plurality of terminals to efficiently receive data for one service. For one service data, the base station allocates only one common channel without allocating a dedicated channel as many as the number of terminals desiring to receive the service in one cell. Since a plurality of terminals simultaneously receives the common channel, efficiency of radio resources is increased. With respect to the MBMS, the UE may receive the MBMS after receiving system information for the corresponding cell.

SUMMARY OF THE INVENTION

Technical subject to be solved by the present invention is to provide a MBMS operation method performed by a UE in a wireless communication system and the UE using the method.

In an aspect, a method for multimedia broadcast/multicast service (MBMS) operation performed by a user equipment (UE) in a wireless communication system is provided. The method comprises receiving at least one MBMS cell list from a network, receiving an offset from the network, and applying the offset to a plurality of cells included in the MBMS cell list, and performing estimation for mobility by applying the offset, and wherein the MBMS cell list includes information on MBMS services provided by the plurality of cells included in the MBMS cell list.

The MBMS cell list may include a cell identifier, frequency information, and a plurality of MBMS services for each of the plurality of cells, and wherein the plurality of cells provide the MBMS service as point-to-multipoint transmission.

When the list of at least one MBMS cell is received from the network, the obtained MBMS cell list may be stored for a predetermined time.

The at least one MBMS cell list may include an MBMS cell list corresponding to an interested MBMS service, and wherein performing the estimation for mobility for a cell included in the MBMS cell list, the offset is applied to a plurality of cells included in the MBMS cell list corresponding to the interested MBMS service.

The at least one MBMS cell list may include an MBMS cell list corresponding to an uninterested MBMS service, and wherein performing the estimation for mobility for a cell included in the MBMS cell list, the offset is not applied to a plurality of cells included in the MBMS cell list corresponding to the interested MBMS service.

The interested MBMS service may be an MBMS service that is receiving or desires to receive via point-to-multipoint transmission.

A cell providing the interested MBMS service may includes a first cell and a second cell, and wherein the offset is applied to the first cell and the second cell.

A value of offset applied to the first cell may be different from a value of offset applied to the second cell.

At least one cell included in the MBMS cell list may be included in an MBSFN (Multimedia Broadcast Multicast Service Single Frequency Network) area.

The UE may be in an RRC connected state, and wherein the estimation for mobility is estimation for triggering a measurement result report.

The method may further comprise transmitting the measurement result report to the network, based on the estimation for triggering the measurement result report.

The UE may be a RRC idle state, and wherein the estimation for mobility is to set a priority for cell selection.

The method may further comprises performing the cell selection by the UE, based on the priority for the cell selection.

In another aspect, a user equipment (UE) is provided. The UE comprises a radio frequency (RF) unit configured to transmit and receive a radio signal and a processor operatively coupled to the RF unit, wherein the processor configured to: receive at least one MBMS cell list from a network, receive an offset from the network and apply the offset to a plurality of cells included in the MBMS cell list, and perform estimation for mobility by applying the offset, and wherein the MBMS cell list includes information on MBMS services provided by the plurality of cells included in the MBMS cell list.

BRIEF DESCRIPTION OF THE DRAWINGS

In this invention, the MBMS operation method and using apparatus performed by a user equipment (UE) in the wireless communication system are provided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
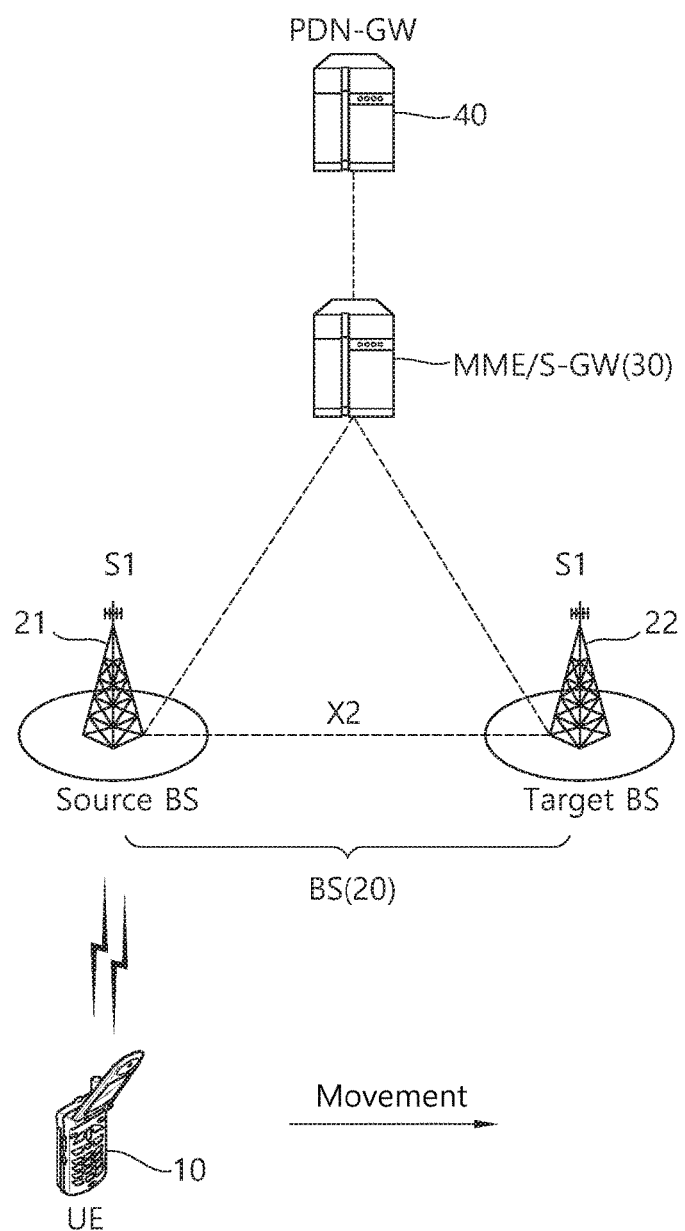
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

Referring to FIG. 1, the E-UTRAN includes at least one base station (BS) 20 that provides a user equipment (UE) with a control plane and a user plane. The UE 10 may be stationary or mobile, and may be referred to by other terms, such as an MS (Mobile Station), an AMS (Advanced MS), a UT (User Terminal), an SS (Subscriber Station), or a wireless device.

The base station 20 generally refers to a station that communicates with the UE 10, and may be referred to by other terms such as an eNodeB (Evolved-NodeB), a BTS (Base Transceiver System), an access point, a femto-eNB, a pico-eNB, a home eNB, or a relay. The base station 20 may provide at least one cell to the UE. The cell may mean a geographical area to in which a communication service is offered or a specific frequency band. The cell may mean a downlink frequency resource and an uplink frequency resource. Or, the cell may mean a combination of a downlink frequency resource and an optional uplink frequency resource. Further, in general case carrier aggregation (CA) is not considered, one cell has a pair of uplink and downlink frequency resources.

An interface for transmission of user traffic or control traffic may be used between base stations 20. The source base station (BS) 21 refers to a base station having a radio bearer currently established with the UE 10, and the target base station (BS) 22 refers to a base station to which the UE 10 is to hand over, disconnecting the radio bearer with the source base station 21.

The base stations 20 may be linked to each other via an X2 interface that is used for exchanging messages between the base stations 20. The base station 20 is linked through an S1 interface to an EPS (Evolved Packet System), more specifically, a mobility management entity (hereinafter, MME)/S-GW (Serving Gateway, 30). The S1 interface supports a many-to-many relation between the base station 20 and the MME/S-GW 30. In order to provide a packet data service to the MME/S-GW 30, a PDN-GW 40 is used. The PDN-GW 40 varies depending on the purpose or service of communication, and a PDN-GW 40 for supporting a specific service can be discovered using APN (Access Point Name) information.

The inter E-UTRAN handover is a basic handover mechanism used for handover between E-UTRAN access networks and consists of X2-based handover and S1-based handover. The X2-based handover is used when the UE hands over from the source BS 21 to the target BS 22 using an X2 interface, and at this time, the MME/S-GW 30 is not changed. By the S1-based handover, the first bearer that has been established between the P-GW 40, MME/S-GW 30, source BS 21, and UE 10 is released, and a new second bearer is established between the P-GW 40, MME/S-GW 30, target BS 22, and UE 10.

Figure 2:
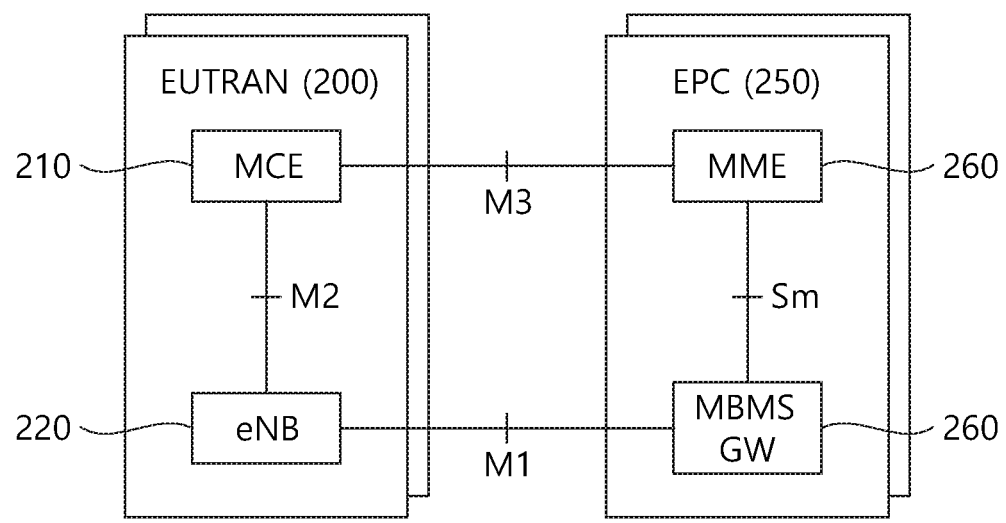
FIG. 2 shows a network architecture of an MBMS to which the present invention applies.
Figure 3:
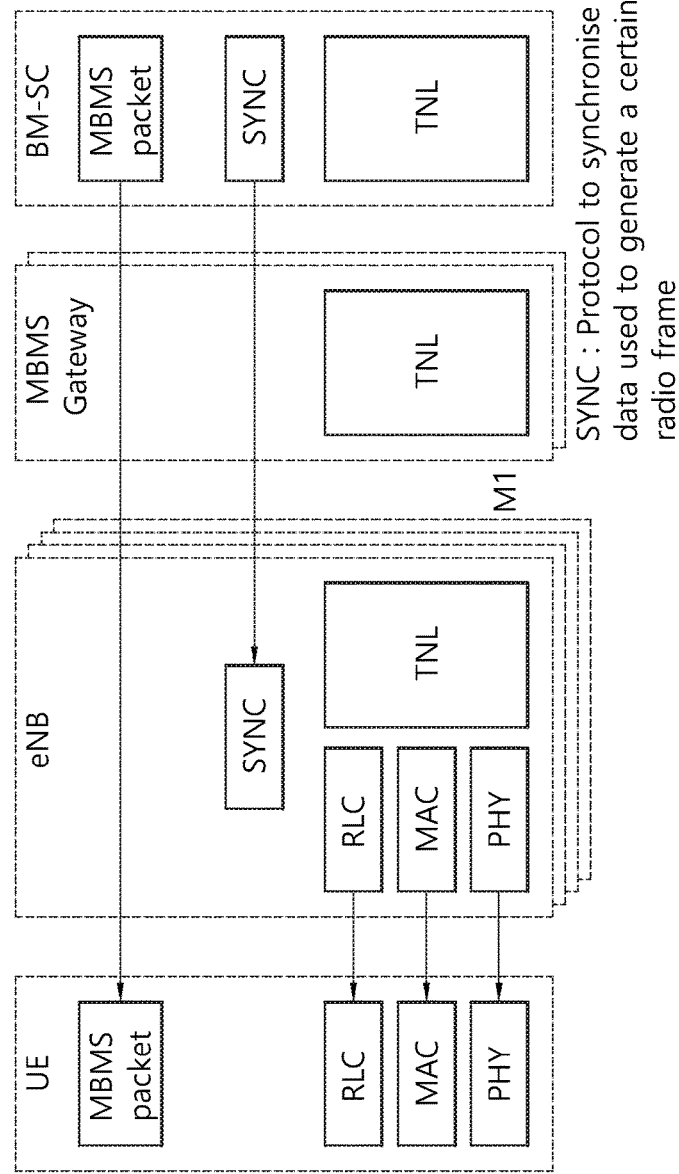
FIG. 3 is a user plane structure for supporting an MBMS.
Figure 4:
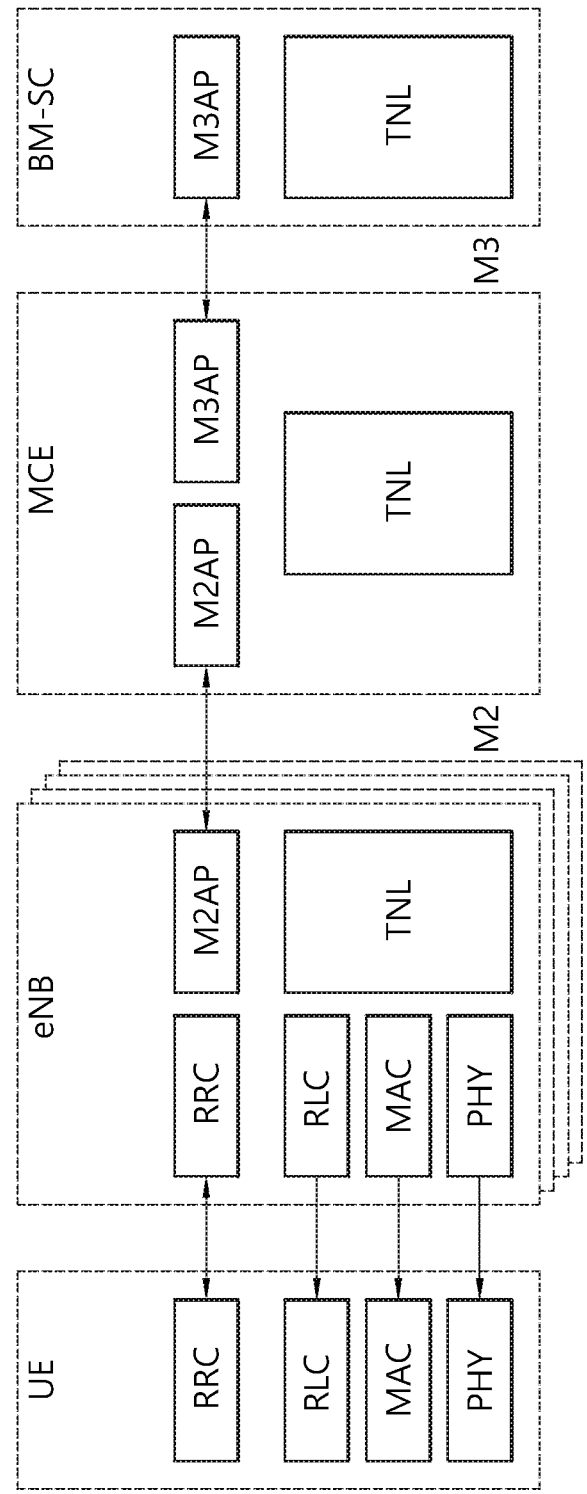
FIG. 4 is a control plane structure for supporting an MBMS.

FIG. 2 shows a network architecture of an MBMS to which the present invention applies.

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MME 260 performs such operations as NAS signaling, roaming, authentication, selection of a PDN gateway and the S-GW, MME selection for handover by an MME change, accessibility to an idle mode UE, or AS security control.

The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

A source cell means a cell in which a terminal is currently provided with a service. The base station providing the source cell is referred to as a source base station. A neighbor cell is a cell adjacent to a source cell in a frequency band or geographically. An adjacent cell using a carrier frequency based on a source cell is referred to as an intra-frequency neighbor cell. In addition, adjacent cells using different carrier frequencies based on source cells are called inter-frequency neighbor cells. In other words, cells that use different frequencies as well as cells that use the same frequency as the source cell can be considered as adjacent cells.

Handover from a source cell to an adjacent cell in a frequency is referred to as intra-frequency handover. On the other hand, the handover from the source cell to the inter-frequency neighbor cell is referred to as inter-frequency handover. In a handover, a neighbor cell in which a terminal moves is called a target cell. The base station that provides the target cell is called the target base station.

The source cell and the target cell may be provided by one base station or by different base stations. Hereinafter, for convenience of explanation, it is assumed that a source cell and a target cell are provided by different base stations, that is, a source base station and a target base station. Therefore, it can be used interchangeably between the source base station and the source cell, and between the target base station and the target cell.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 5:
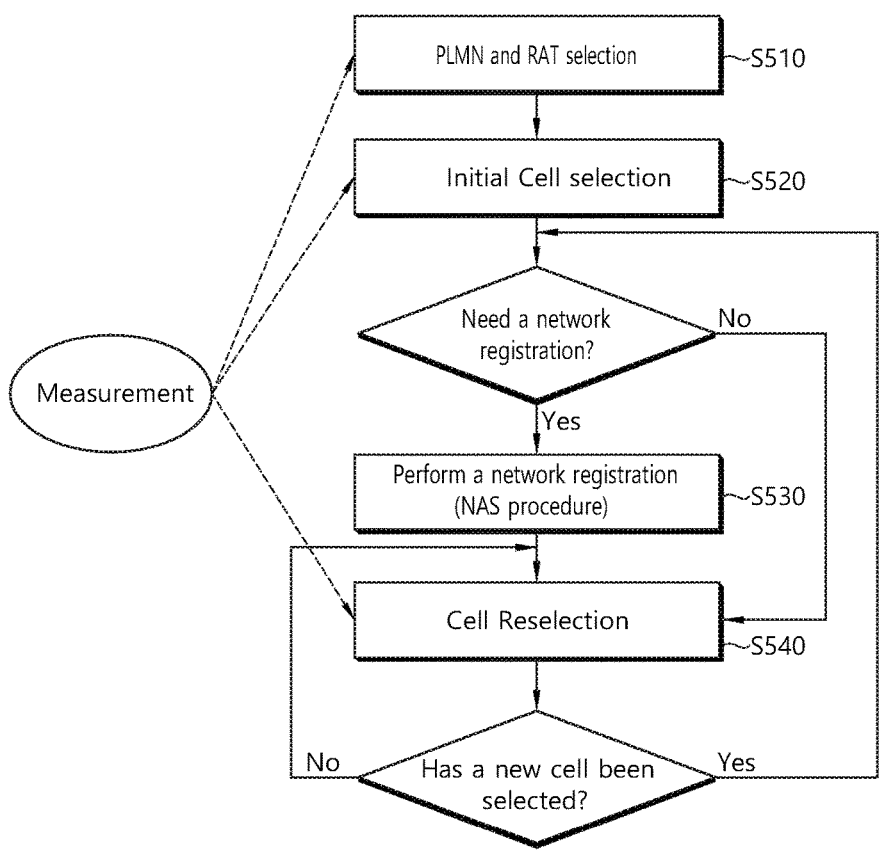
FIG. 5 is a flowchart illustrating the operation of UE in the RRC idle state.

FIG. 5 is a flowchart illustrating the operation of UE in the RRC idle state. FIG. 5 illustrates a procedure in which UE that is initially powered on experiences a cell selection procedure, registers it with a network, and then performs cell reselection if necessary.

Referring to FIG. 5, the UE selects Radio Access Technology (RAT) in which the UE communicates with a Public Land Mobile Network (PLMN), that is, a network from which the UE is provided with service (S510). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S520). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S530). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S540). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 6:
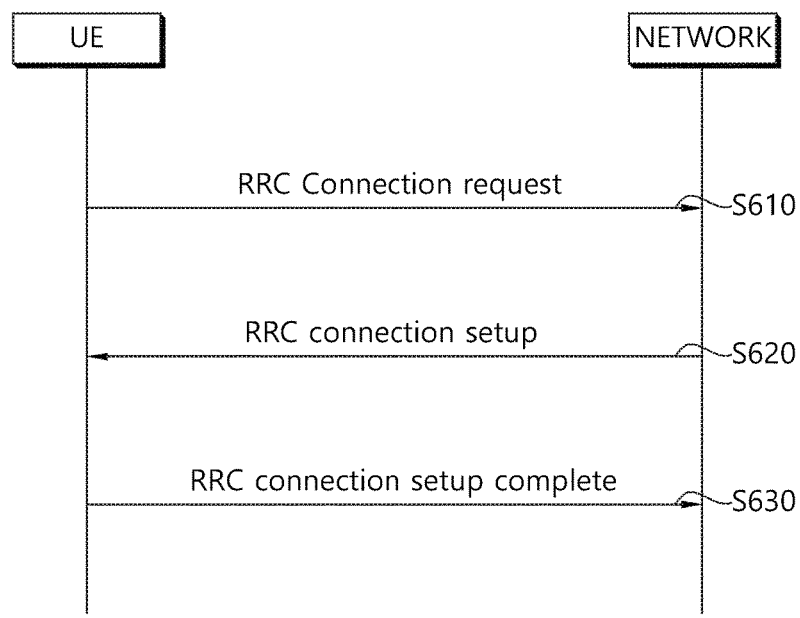
FIG. 6 is a flowchart illustrating a process of establishing an RRC connection.

FIG. 6 is a flowchart illustrating a process of establishing an RRC connection.

A UE sends an RRC Connection Request message to a network for requesting RRC connection (S610). In this case, the UE may be in the RRC IDLE state. Also, when sending an RRC connection request message to the network, the UE may start a timer, and the timer in this case may be T300 of 3GPP TS 36.331.

The network sends an RRC Connection Setup message in response to the RRC connection request (S620). After receiving the RRC connection setup message, the UE enters the RRC connection mode. In this case, the UE may suspend the timer in the step of S510.

The UE sends to the network a RRC Connection Setup Complete message to be used for confirming successful completion of the RRC connection establishment (S630).

Figure 7:
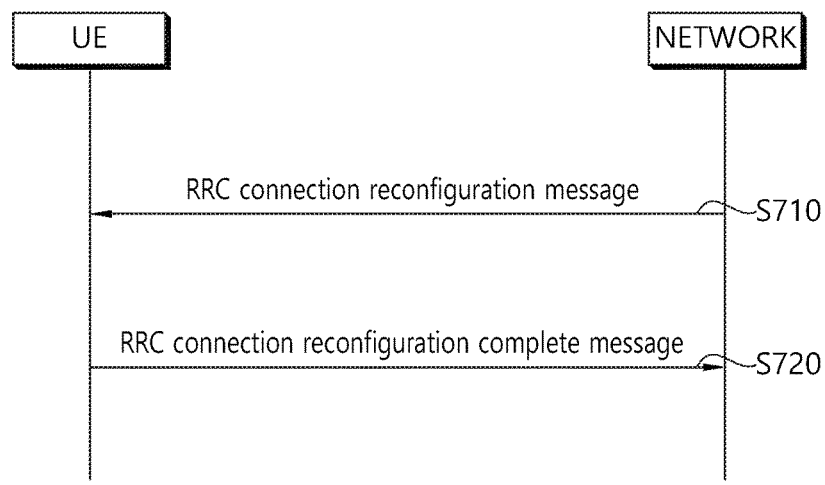
FIG. 7 is a flowchart illustrating an RRC connection reconfiguration procedure.

FIG. 7 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S710).

As a response to the RRC connection reconfiguration message, the UE sends an RRC connection reconfiguration complete message used to check the successful completion of the RRC connection reconfiguration to the network (S720).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srlev > 0 \text{ AND } Squal > 0.$$

where:

$$Srxlev = Q_{rxlevmeas} - (Q_{rxlevmin} - Q_{rxlevminoffset}) - P_{compensation}.$$

$$Squal = Q_{qualmeas} - (Q_{qualmin} - Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |

TABLE 1-continued

| | |
|---|---|
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst} R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 8:
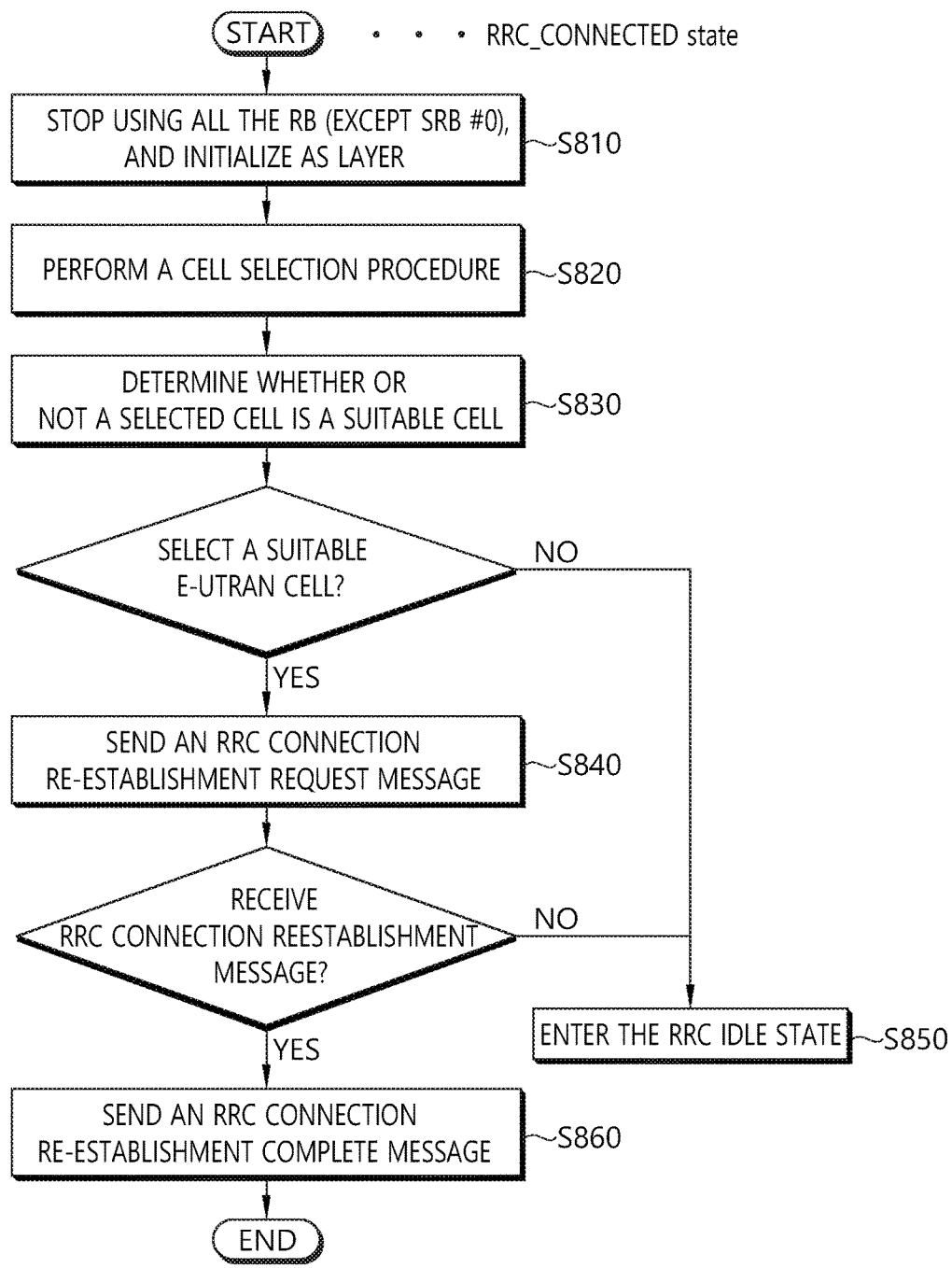
FIG. 8 is a diagram illustrating an RRC connection re-establishment procedure.

FIG. 8 is a diagram illustrating an RRC connection re-establishment procedure.

Referring to FIG. 8 UE stops using all the radio bearers that have been configured other than a Signaling Radio Bearer (SRB) #0, and initializes a variety of kinds of sublayers of an Access Stratum (AS) (S810). Furthermore, the UE configures each sublayer and the PHY layer as a default configuration. In this procedure, the UE maintains the RRC connection state.

The UE performs a cell selection procedure for performing an RRC connection reconfiguration procedure (S820). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S830). If the selected cell is determined to be a suitable E-UTRAN cell, the UE sends an RRC connection re-establishment request message to the corresponding cell (S840).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S850).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S860).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 9:
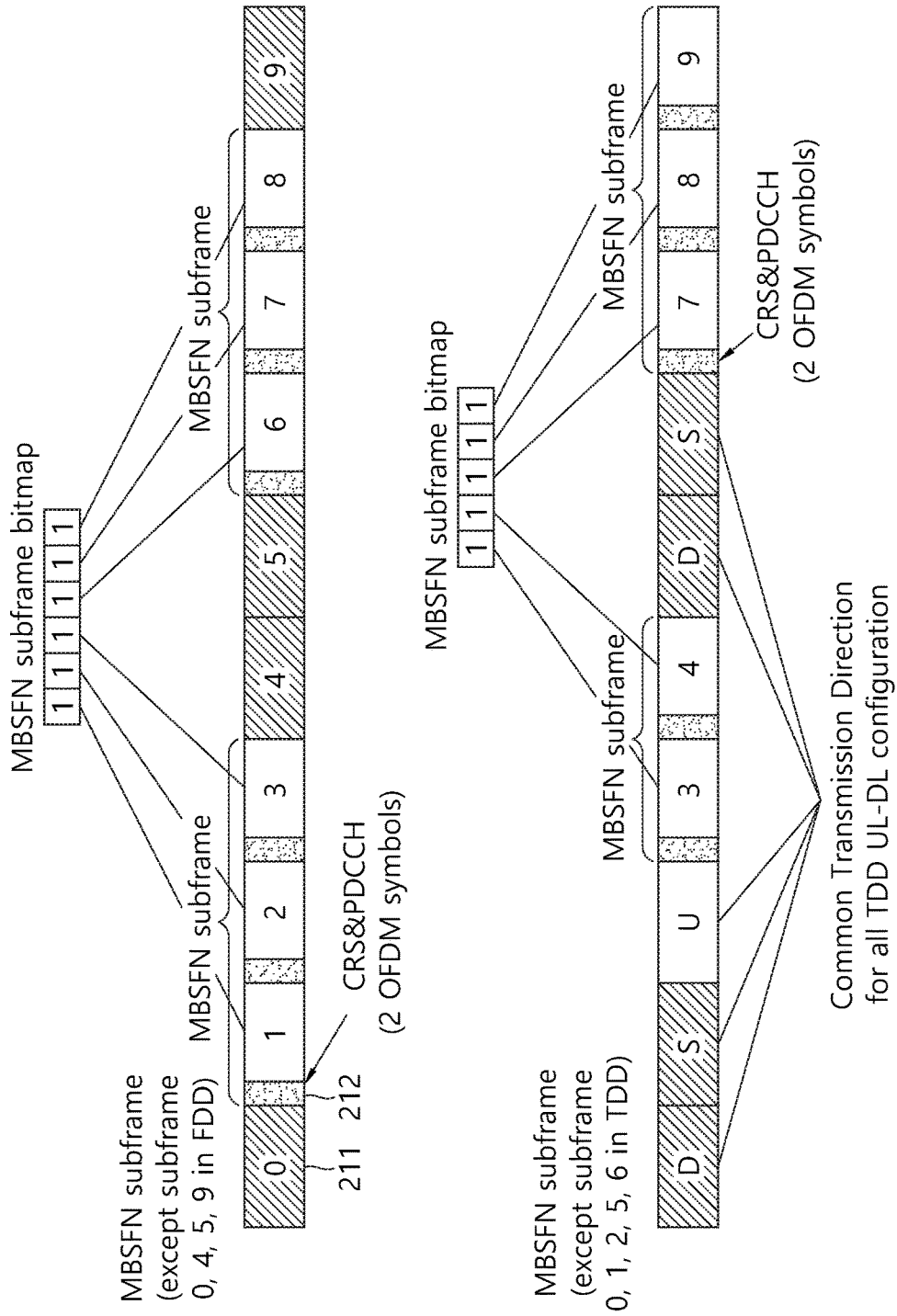
FIG. 9 illustrates a structure of a MBSFN (Multimedia Broadcast Multicast Service Single Frequency Network) subframe.

FIG. 9 illustrates a structure of a MBSFN (Multimedia Broadcast Multicast Service Single Frequency Network) subframe.

Referring to FIG. 9, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe.

Since most UEs perform radio resource management (RRM), radio link failure (RLF) processing, and synchronization using a CRS, it is important to indicate the absence of a CRS in a specific region.

A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 911 uses a normal CP, a CRS according to the normal CP is also used in the first two OFDM symbols 912 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 10:
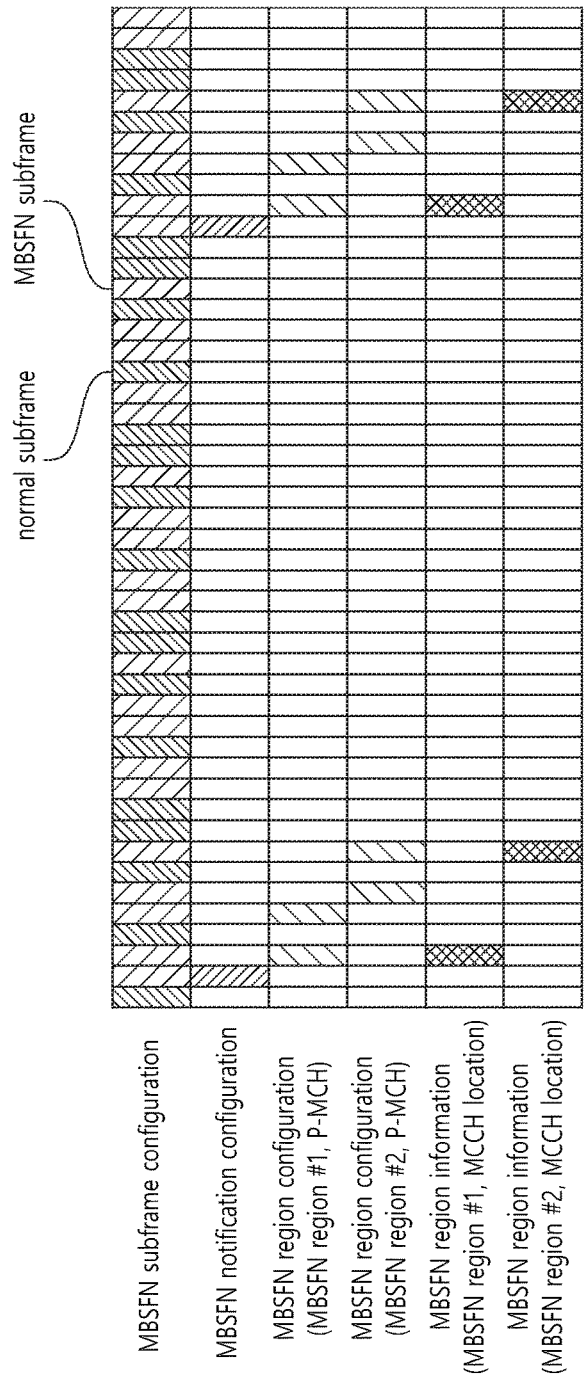
FIG. 10 illustrates an example of a configuration for performing the MBMS service.

FIG. 10 illustrates an example of a configuration for performing the MBMS service.

Referring to FIG. 10, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MB SFN region, the MBSFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Figure 11:
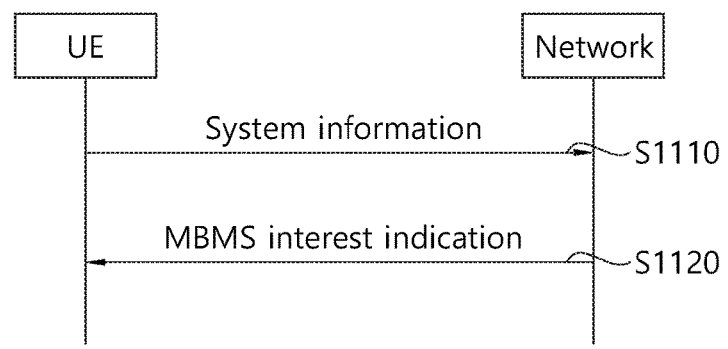
FIG. 11 is a flowchart illustrating an example in which an MBMS interest indication message is transmitted.

FIG. 11 is a flowchart illustrating an example in which an MBMS interest indication message is transmitted.

Referring to FIG. 11, an eNB transmits a system information block (SIB) 15, which is system information defined for the MBMS service, to the UE (S1110). The SIB 15 may include MBMS service area identities (SAIs) of current and/or neighbor carrier frequencies. Table 2 shows an example of SIB15.

TABLE 2

```
-- ASN1START
SystemInformationBlockType15-r11 ::=   SEQUENCE {
    mbms-SAI-IntraFreq-r11              MBMS-SAI-List-r11              OPTIONAL, --
Need OR
    mbms-SAI-IntraFreqList-r11          MBMS-SAI-InterFreqList-r11     OPTIONAL, --
Need OR
    lateNonCriticalExtension            OCTET STRING                   OPTIONAL,
    ...,
    [[ mbms-SAI-InterFreqList-v1140     MBMS-SAI-InterFreqList-v1140   OPTIONAL  --
Cond InterFreq
    ]]
}
MBMS-SAI-List-r11 ::=             SEQUENCE (SIZE (1..maxSAI-MBMS-r11)) OF MBMS-SAI-r11
MBMS-SAI-r11 ::=                  INTEGER (0..65535)
MBMS-SAI-InterFreqList-r11 ::=    SEQUENCE (SIZE (1..maxFreq)) OF MBMS-SAI-InterFreq-r11
MBMS-SAI-InterFreqList-v1140 ::=  SEQUENCE (SIZE (1..maxFreq)) OF MBMS-SAI- InterFreq-
v1140
MBMS-SAI-InterFreq-r11 ::=        SEQUENCE {
    dl-CarrierFreq-r11                ARFCN-ValueEUTRA-r9,
    mbms-SAI-List-r11                 MBMS-SAI-List-r11
}
MBMS-SAI-InterFreq-v1140 ::=      SEQUENCE {
    multiBandInfoList-r11             MultiBandInfoList-r11          OPTIONAL  --
Need OR
}
-- ASN1STOP
```

In Table 2, the sai-IntraFreq field includes a list of MBMS service area identifiers of the carrier frequencies to which current UE is connected. The sai-InterFreqList field includes a list of neighbor frequencies providing the MBMS service and a list of MBMS service area identifiers corresponding thereto. The sai-List field includes a list of MBMS service area identifiers for a specific frequency.

The UE transmits an MBMS Interest indication message to the eNB through an MBMS point to multipoint radio bearer (S1120). In this case, the UE may be in an RRC connection state. In addition, the UE may inform the eNB of the frequency of providing the MBMS service that it is interested in receiving or receiving, through the MBMS Interest indication message. The UE may inform the eNB of the frequency of providing the MBMS service that it does not receive or is no longer interested in receiving, through the MBMS Interest indication message. In addition, the UE may inform the MBMS service whether the MBMS service is prioritized over the unicast reception, through the MBMS Interest indication message. The MBMS Interest indication message may be transmitted via a dedicated control channel (DCCH), which is a logical channel. A signaling radio bearer (SRB) for the MBMS Interest indication message is SRB1, and the MBMS Interest indication message may be transmitted based on an acknowledgment mode. Table 3 shows an example of the MBMS interest indication message.

TABLE 3

```
-- ASN1START
MBMSInterestIndication-r11 ::=      SEQUENCE {
    criticalExtensions                  CHOICE {
        c1                                  CHOICE {
            interestIndication-r11              MBMSInterestIndication-r11-IEs,
            spare3 NULL, spare2 NULL, spare1 NULL
        },
        criticalExtensionsFuture            SEQUENCE { }
    }
}
MBMSInterestIndication-r11-IEs ::=  SEQUENCE {
    mbms-FreqList-r11                   CarrierFreqListMBMS-r11   OPTIONAL,
    mbms-Priority-r11                   ENUMERATED (true)         OPTIONAL,
    lateNonCriticalExtension            OCTET STRING              OPTIONAL,
    nonCriticalExtension                SEQUENCE ( )              OPTIONAL
}
-- ASN1STOP
```

In Table 3, the mbms-FreqList field indicates a list of frequencies for which the UE is receiving or is interested in receiving MBMS service. The mbms-Priority field indicates whether the UE prioritizes MBMS reception over unicast reception. If the UE has priority over reception of a frequency for providing all MBMS services over reception of a unicast bearer, the value of the mbms-Priority field may be true. Otherwise, the mbms-Priority field may be omitted.

It may be seen that the eNB receiving the MBMS Interest indication message is interested in moving to a cell operating at a frequency at which the UE provides the MBMS service. The eNB may handover the UE to a cell having a specific frequency that provides a specific MBMS service and allow the UE to smoothly receive the MBMS service after handover. In addition, when the UE performs a handover from a first eNB to a second eNB, the first eNB may forward the MBMS Interest indication message received from the UE to the second eNB through the MBMS UE context. That is, the UE does not need to transmit the MBMS Interest indication again to the second eNB. Even after the UE is handed over to the second eNB, the second eNB may allow the UE to continue to smoothly receive the MBMS service.

Meanwhile, a UE in an MBSFN (Multimedia Broadcast Multicast Service Single Frequency Network) area may move to a non-MBSFN area. Hereinafter, an example of a case where a mobile station in the MBSFN area moves to a non-MBSFN area will be described in detail.

Figure 12:
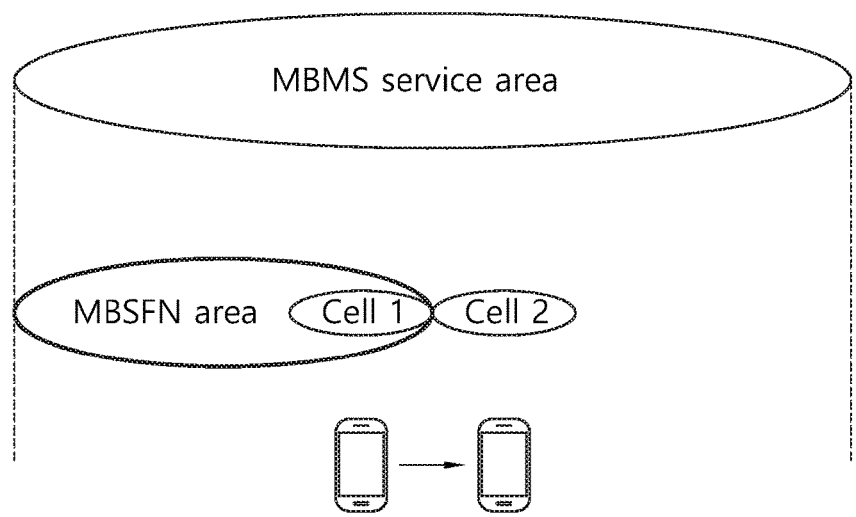
FIG. 12 is a diagram schematically illustrating an example when a UE (user equipment) moves to a cell other than an MBSFN area.

FIG. 12 is a diagram schematically illustrating an example when a UE (user equipment) moves to a cell other than an MBSFN area.

Referring to FIG. 12, processes when the UE moves from the MBSFN area to the non-MBSFN area may be proceeded as follows.

1) First, a UE may be connected to a cell corresponding to an MBSFN area, and the UE may receive an MBSFN service of interest. In this case, the cell corresponding to the MBSFN area may be defined as cell 1, and the UE in this case may be a UE located in the cell 1 of FIG. 12 (Step 1).

2) The UE may be handed over to a cell located in an area outside the MBSFN area, as shown in FIG. 12. In this case, the cell located in an area outside the MBSFN area may correspond to cell 2 in FIG. 12. After reading the system information (e.g., SIB 13) of a cell located in an area outside the MBSFN area, it may be found that a cell located in an area out of the MBSFN area handed over by the UE is located outside the MBSFN area. (Step 2)

3) The UE may read the system information (e.g., SIB 15) on the cell 2 and find that there is no suitable frequency to continue receiving the MBMS service of interest. (Step 3)

4) The UE may trigger a unicast bearer setup through application level signaling to continuously receive group communication via unicast. (Step 4)

The UE at the edge of the MBSFN area may be interrupted in the service according to the MBSFN signal quality and the UE capability at any stage except the step 1 of the process when the UE moves from the MBSFN area to the non-MBSFN area as described above. The interruption time of the above-mentioned service is shown in Table 4 below.

TABLE 4

| Component | Time | Comments |
|---|---|---|
| MIB reading delay on Cell2 | 40 ms | |
| SIB1 reading delay on Cell2 | 80 ms | |
| SIB2, SIB13 and SIB15 reading delay on Cell2 | 160 ms | Assuming SIB13/15 scheduling periodicity is 320 ms, and SIB2 scheduling periodicity is shorter. |
| State transition delay from RRC_IDLE to RRC_CONNECTED | 80 ms | Section B.1.1.1 of TR 36.912 |
| Dedicated bearer for VoIP establishment | 115 ms | Section 5.1.1.1 of TR 36.868 |
| Total delay | 475 ms | |

According to Table 4, when the UE moves from the MBSFN area to the non-MBSFN area, it may be seen that the service interruption time of about 500 ms is observed. The occurrence of the service interruption time described above has negative effect on interference sensitive services.

Accordingly, in the present invention, in order to reduce the service interruption time that occurs as the UE moves from the MBSFN area to the non-MBSFN area, a method will be proposed for applying an offset to a cell in which an MBMS in which the UE is interest in is supported, using a list of cells which supports the MBMS and an apparatus using the method.

Figure 13:
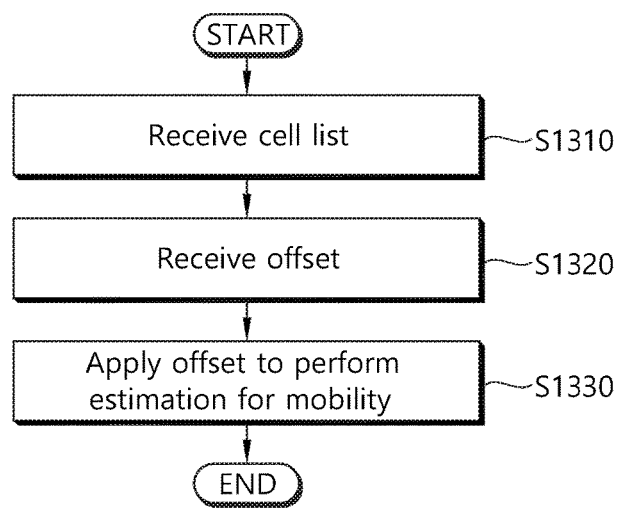
FIG. 13 is a flowchart of an offset-based mobility estimation procedure, in accordance with an embodiment of the present invention.

FIG. 13 is a flowchart of an offset-based mobility estimation procedure, in accordance with an embodiment of the present invention.

Referring to FIG. 13, the UE may receive at least one cell list from the network (S1310). In this case, the cell list may indicate an MBMS cell list, and the MBMS cell list may include information on an MBMS service provided by at least one or more cells included in the MBMS cell list. The network provides each MBMS service in a unit of cell list, that is, cells in the same cell list may provide the same MBMS service. For example, if a UE receives a cell list from a network and the cell list includes a first cell and a second cell, the first cell and the second cell provide the same MBMS service, and the same MBMS service may be provided to the UE from the first cell and the second cell.

Hereinafter, 1) the configuration of the MBMS cell list and 2) handling of the MBMS cell list by the UE will be described in more detail.

1) Configuration of MBMS cell list

The MBMS cell list may be configured as follows.

a list of {physical cell identifier+frequency} (i.e., a list of physical cell identifiers and frequencies); or a list of physical cell identifiers for each frequency; or a list of global cell identifiers That is, the MBMS cell list includes cell identifiers and frequency information for each of a plurality of cells, and the plurality of cells may provide MBMS services by point-to-multipoint transmission.

In this case, for the MBMS cell list, it may be signaled in each MBSFN area, each service area, each service (e.g., MBMS service or GC service), or each frequency unit.

2) Handling of MBMS cell list

Once the UE has acquired the MBMS cell list, the UE may be allowed to store or apply the acquired cell list for a predetermined time (e.g., N hours).

If the UE selects a cell not providing an MBMS cell list but the cell is not included in the already acquired cell list, the UE may not discard the previously obtained cell list.

Or, if the UE has selected a cell that does not provide an MBMS cell list, and the cell is not included in the already acquired cell list, the UE may discard the previously obtained cell list.

Or, if the selected cell provides an MBMS cell list, the UE may discard the stored MBMS cell list and apply newly received MBMS cell list from the selected cell.

The UE may receive the offset from the network (S1320), and the offset in this case may correspond to the cell list. In addition, the offset may be cell specific offset. The process of receiving the offset from the network by the UE may be performed simultaneously with the process of receiving the cell list from the network by the UE. That is, the UE may simultaneously receive the cell lists and the offsets from the network.

In this case, the offset received by the UE may be applied to each cell in the cell list received by the UE, and the offset received by the UE may be applied to the cell list unit received by the UE. In addition, when the offset is applied to each cell belonging to the cell list received by the UE, different values may be applied. That is, if there is a plurality of cells included in one cell list, a different offset value may be applied to each of the plurality of cells.

The UE may perform estimation for the mobility by applying the offset to a cell providing an MBMS service having an interest (S1330). In this case, the UE determines whether to apply the offset to a cell providing an MBMS service of interest, and may perform estimation for mobility by applying the offset.

The UE may apply the offset to the cell providing the MBMS care service of the UE. More specifically, when a cell included in the MBMS cell list is found, the UE may apply an offset to a cell included in the MBMS cell list. However, the UE may not apply the offset to the cell even if a cell included in the MBMS cell list is found. That is, even if a cell included in the MBMS cell list is found, the UE may adaptively apply the offset to the cells included in the MBMS cell list, instead of applying the offset unconditionally. For example, when the cell 1 and the cell 2 are included in the MBMS cell list, the UE applies an offset only to the cell 1, or the UE applies an offset only to the cell 2, and although the UE applies an offset to the cell 1 and cell 2, the value of the offset applied to each of the cell 1 and cell 2 may be different from each other.\

In addition, the UE may receive at least one MBMS cell list from the network, and among the MBMS cell lists received by the UE, a MBMS cell list corresponding to an interested MBMS service to the UE and a MBMS cell list corresponding to an uninterested MBMS service to the UE may be included therein. In this case, the UE may apply the offset to the cells included in the MBMS cell list providing the MBMS service of interest to the UE. If the UE finds a cell included in an MBMS cell list providing an MBMS service in which the UE is not interested, the UE may not apply the offset to the cell included in the MBMS cell list providing the MBMS service in which the UE is not interested. In conclusion, the UE may apply the offset as a whole to the cell in the cell list providing the MBMS in which the UE is interested, while the UE may not apply the offset as a whole to the cells in the cell list without providing the MBMS in which the UE is interested. However, even when an offset is applied to cells in a cell list providing an MBMS service of interest, the value of an offset applied to each cell in a cell list providing an MBMS service of interest to the UE may be different from each other.

Here, in the specification, the MBMS service of interest may be an MBMS service that is receiving or desiring to receive via point-to-multipoint transmission.

As an example of estimation for mobility, it may be divided into the case where the UE is in the RRC connected state and the case where the RRC idle state, Specific embodiments of 1) a case of applying the offset in the RRC connection state and 2) the case of applying the offset in the RRC idle state will be described later.

Figure 14:
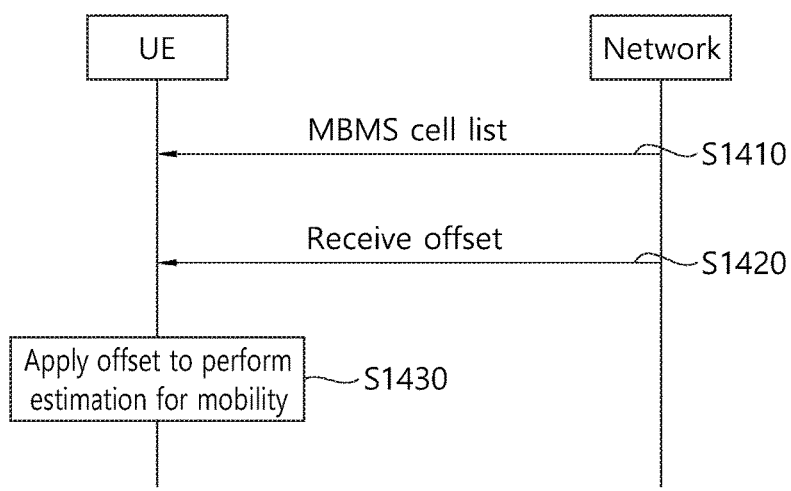
FIG. 14 is a flowchart illustrating an offset-based mobility estimation process in different manner, according to an embodiment of the present invention in FIG. 13.

FIG. 14 is a flowchart illustrating an offset-based mobility estimation process in different manner, according to an embodiment of the present invention in FIG. 13.

Referring to FIG. 14, the UE may receive a cell list from a network (S1410). In this case, the process of receiving the cell list from the network and detailed contents of the cell list are as described above.

The UE may receive the offset from the network (S1420). In this case, the process of receiving the offset from the network and detailed contents of the offset are as described above.

The UE applies the offset to a cell providing an MBMS service of interest to perform estimation for mobility (S1430). In this case, detailed contents that the UE performs the estimation for mobility by applying the offset as described above.

Figure 15:
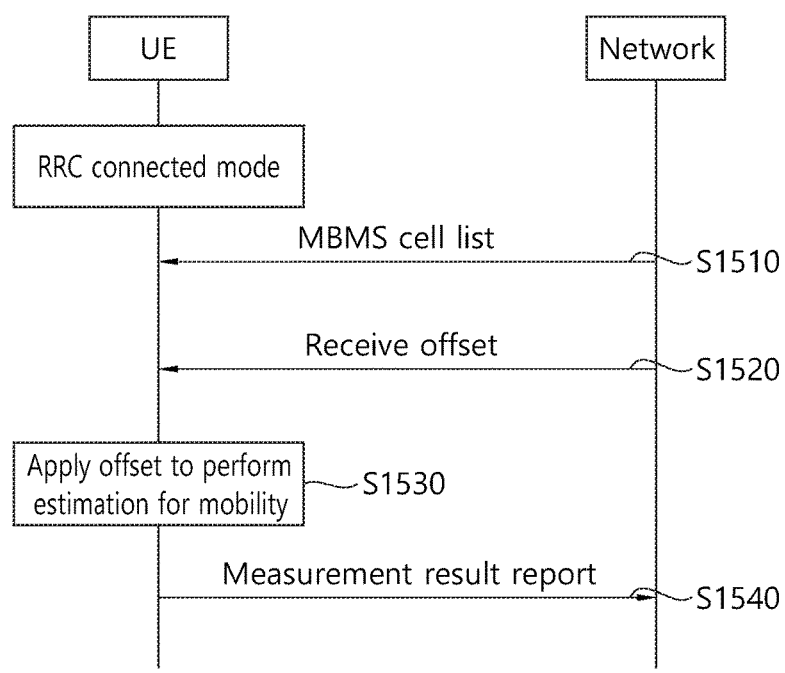
FIG. 15 is a flowchart of a mobility estimation process based on offset in RRC_CONNECTED mode.

FIG. 15 is a flowchart of a mobility estimation process based on offset in RRC_CONNECTED mode.

Referring to FIG. 15, a UE may receive a cell list from a network (S1510). In this case, the process of receiving the cell list from the network and the specific contents of the cell list are as described above.

The UE may receive the offset from the network (S1520). In this case, the process of receiving the offset from the network and detailed contents of the offset are as described above.

The UE may perform estimation for mobility by applying the offset to a cell providing an MBMS service of interest (S1530). In this case, estimation for mobility may mean estimation for triggering report.

More specifically, in the RRC connection mode, a UE receiving an MBMS service from an MBSFN area may apply an MBMS-specific offset to a specific cell for continuous reception of the MBMS service through the unicast/MBMS bearer. In this case, the specific cell may be a cell for event estimation for a measurement report related to the specific cell, and the specific cell may be included in the MBMS cell list.

That is, when the UE perform estimation for a measurement event for a cell included in the MBMS cell list, the UE may apply an MBMS specific offset to the cell, and in this case, the cell may be a cell in which measurement report triggering may be performed. In this case, the offset may be applied to a cell which is a current serving cell. In addition, the offset may be applied to a cell that is a neighboring cell.

An example of applying an MBMS offset is as follows.

1) Event A3: Conditions for determining whether the measurement signal (Mn) of the neighboring cell is better by a predetermined value (offset) than the measurement signal (Mp) of the serving cell/primary cell (PCell) (Neighbour becomes offset better than PCell)

In this case, entering condition is expressed by Equation 2, and leaving condition is expressed by Equation 3.

$$Mn+Ofn+Ocn-Hys+O_{MBMSn}>Mp+Ofp+Ocp+Off+O_{MBMSp} \quad \text{[Equation 2]}$$

$$Mn+Ofn+Ocn+Hys+O_{MBMSn}<Mp+Ofp+Ocp+Off+O_{MBMSp} \quad \text{[Equation 3]}$$

Mn: measurement result of neighboring cell without considering any offset

Ofn: a frequency-specific offset for a frequency of the neighboring cell (i.e., offsetFreq as defined in measObjectEUTRA corresponding to the frequency of the neighboring cell)

Ocn: a cell specific offset of the neighboring cell (i.e., cellIndividualOffset as defined in measObjectEUTRA corresponding to the frequency of the neighboring cell), or set as 0 if not set for the neighboring cell Mp: measurement result of PCell without considering any offset Ofp: a frequency-specific offset for the primary frequency (i.e., offsetFreq as defined in measObjectEUTRA corresponding to the primary frequency)

Ocp: set the PCell's cell-specific offset (ie cellIndividualOffset as defined in measObjectEUTRA corresponding to the primary cell), or set as 0 if not set for PCell Hys: hysteresis parameter for the event (i.e. hysteresis as defined in reportConfigEUTRA for the event)

Off: Offset parameter for the event (i.e. a 3 offset as defined in reportConfigEUTRA for the event)

Mn, Mp: expressed in dBm in case of RSRP, or dB in case of RSRQ

Ofn, Ocn, Ofp, Ocp, Hys, Off: expressed in dB

In this case, in Equations 2 and 3, $O_{MBMSn}$ and $O_{MBMSp}$ applied to the left and right sides respectively indicate MBMS specific offsets, and the MBMS specific offsets may be applied to either the left side or the right side. In addition, although the MBMS specific offset is applied to both sides, the values of the MBMS specific offsets applied to the left and right sides may be different from each other.

For example, if the UE is located in a cell where the MBMS service of interest is not currently provided, and the neighboring cell is provided with the MBMS service of interest, $O_{MBMSn}$ may be applied only to the left side in Equation (2). On the contrary, if the UE is located in a cell where the MBMS service of interest is currently provided, and the neighboring cell is not provided with the MBMS service of interest, $O_{MBMSp}$ may be applied only to the right side in Equation (2). In addition, when the UE is located in a cell in which the MBMS service is currently provided and the neighboring cell is also provided with the MBMS service of interest, $O_{MBMSp}$ may be applied to the left side and $O_{MBMSp}$ may be applied to the right side.

2) Event A4: When the measurement signal of the neighboring cell exceeds the threshold (Neighbor becomes better than threshold)

In this case, the entering condition is expressed by Equation 4, and the leaving condition is expressed by Equation 5.

$$Mn+Ofn+Ocn-Hys+O_{MBMS} > \text{Thresh} \quad \text{[Equation 4]}$$

$$Mn+Ofn+Ocn+Hys+O_{MBMS} < \text{Thresh} \quad \text{[Equation 5]}$$

Mn: measurement result of neighboring cell without considering any offset

Ofn: a frequency-specific offset for a frequency of the neighboring cell (i.e., offsetFreq as defined in measObjectEUTRA corresponding to the frequency of the neighboring cell)

Ocn: a cell specific offset of the neighboring cell (i.e., cellIndividualOffset as defined in measObjectEUTRA corresponding to the frequency of the neighboring cell), or set as 0 if not set for the neighboring cell Hys: hysteresis parameter for the event (i.e., Hysteresis as defined in reportConfigEUTRA for the event)

Threshold: threshold parameter for the event (i.e., a4-threshold as defined in reportConfigEUTRA for the event)

Ofn, Ocn, Hys: expressed in dB

Thresh: expressed in the same unit as Mn (i.e., expressed in dBm in case of RSRP, or in dB in RSRQ case)

In this case, in Equation 4 and Equation 5, the $O_{MBMS}$ applied to the left side means an MBMS specific offset.

Then, the UE may report the measurement result to the network based on the estimation (S1540).

Figure 16:
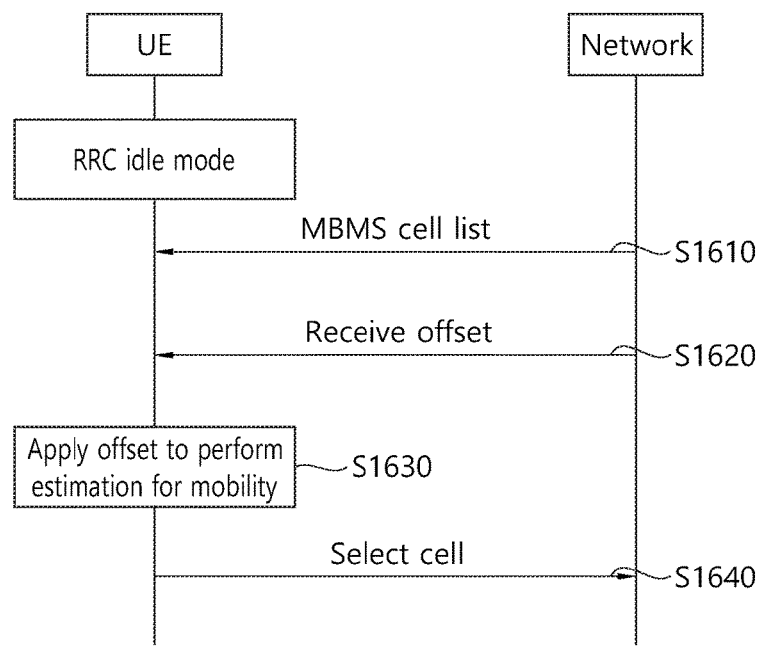
FIG. 16 is a flowchart of a mobility estimation process based on offsets in the RRC_IDLE mode.

FIG. 16 is a flowchart of a mobility estimation process based on offsets in the RRC_IDLE mode.

Referring to FIG. 16, a UE may receive a cell list from a network (S1610). In this case, the process of receiving the cell list from the network and the detailed contents of the cell list are described as above.

The UE may receive the offset from the network (S1620). In this case, the process of receiving the offset from the network and the detailed contents of the offset are described as above.

The UE may perform estimation for the mobility by applying the offset to a cell providing an MBMS service of interest (S1630). In this case, the estimation for mobility may refer to setting of cell ranking for cell selection.

More specifically, in the RRC idle mode, the UE may apply an MBMS specific offset to cells included in the MBMS cell list related to cell selection or cell re-selection in order to give priority the cells included in the MBMS cell list. The above-described offset may be applied to the current serving cell, or the above-described offset may also be applied to the current neighboring cell.

The cell ranking reference Rs for the serving cell and the ranking reference Rn for the neighboring cell are as shown in Equations 7 and 8 below.

$$Rs = Q\text{meas},s + Q\text{Hyst} + Q\_mbms \quad \text{[Equation 7]}$$

$$Rn = Q\text{meas},n - Q\text{offset} + Q\_mbms \quad \text{[Equation 8]}$$

In this case, coefficients applied to Equations 6 and 7 are shown in Table 5 below.

TABLE 5

| | |
|---|---|
| $Q_{meas}$ | RSRP measurement quantity used in cell reselections. |
| Qoffset | For intra-frequency: Equals to $Q\text{offset}_{s,\,n}$, if $Q\text{offset}_{s,\,n}$ is valid, otherwise this equals to zero.<br>For inter-frequency: Equals to $Q\text{offset}_{s,\,n}$ plus $Q\text{offset}_{frequency}$, if $Q\text{offset}_{s,\,n}$ is valid, otherwise this equals to $Q\text{offset}_{frequency}$. |
| Qmbms | Applied if the concerned cell is included in the MBMS cell list corresponding to the interesting MBMS service |

Thereafter, the UE may perform cell selection based on the estimation (S1640).

Figure 17:
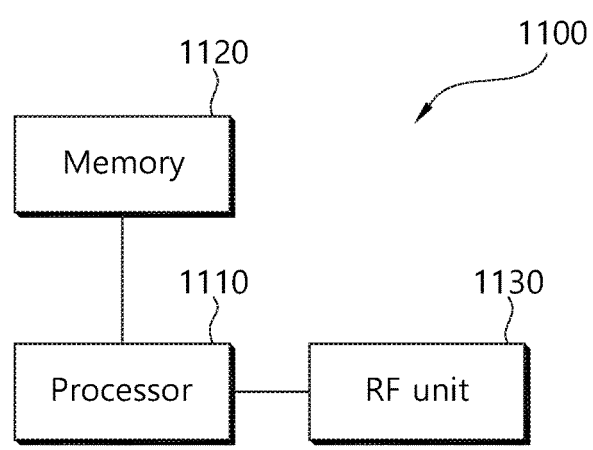
FIG. 17 is a block diagram illustrating a UE in which an embodiment of the present invention is implemented.

FIG. 17 is a block diagram illustrating a UE in which an embodiment of the present invention is implemented.

Referring to FIG. 17, a UE 1100 includes a processor 1110, a memory 1120, and a radio frequency unit (RF) unit 1130. Processor 1110 implements the proposed functionality, process and/or method. For example, the processor 1110 may receive at least one MBMS cell list from the network via the RF unit 1130.

In this case, the processor 1110 may receive an offset from the network through the RF unit 1130, and the processor 1110 may perform estimation for mobility by applying the offset of the cell providing MBMS service of interest through the RF unit 1130.

The RF unit 1130 is coupled to the processor 1110 and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor in a variety of well-known means.

What is claimed is:

1. A method for multimedia broadcast/multicast service (MBMS) operation performed by a user equipment (UE) in a wireless communication system, the method comprising:
   receiving MBMS cell list information including at least one MBMS cell list from a network;
   receiving offset information including at least one offset from the network;
   applying the at least one offset to a plurality of cells providing at least one MBMS service of interest; and
   performing estimation for mobility by applying the at least one offset, wherein the MBMS cell list information further includes information on MBMS services provided by cells of the at least one MBMS cell list, wherein the plurality of cells are included in the cells of the at least one MBMS cell list, wherein each of the MBMS services, including the at least one MBMS service of interest, is provided, by the network, in a unit of MBMS cell list, and wherein the at least one offset is MBMS service-specific.

2. The method of claim 1,
wherein the MBMS cell list includes a cell identifier, frequency information, and a plurality of MBMS services for each of the plurality of cells, and
wherein the plurality of cells provide the MBMS service as point-to-multipoint transmission.

3. The method of claim 1,
wherein when the list of at least one MBMS cell is received from the network, the obtained MBMS cell list is stored for a predetermined time.

4. The method of claim 1,
wherein the at least one MBMS cell list includes an MBMS cell list corresponding to an interested MBMS service, and
wherein performing the estimation for mobility for a cell included in the MBMS cell list, the offset is applied to a plurality of cells included in the MBMS cell list corresponding to the interested MBMS service.

5. The method of claim 4,
wherein the at least one MBMS cell list includes an MBMS cell list corresponding to an uninterested MBMS service, and
wherein performing the estimation for mobility for a cell included in the MBMS cell list, the offset is not applied to a plurality of cells included in the MBMS cell list corresponding to the interested MBMS service.

6. The method of claim 4,
wherein the interested MBMS service is an MBMS service that is receiving or desires to receive via point-to-multipoint transmission.

7. The method of claim 4,
wherein a cell providing the interested MBMS service includes a first cell and a second cell, and
wherein the offset is applied to the first cell and the second cell.

8. The method of claim 1,
wherein at least one cell included in the MBMS cell list is included in an MBSFN (Multimedia Broadcast Multicast Service Single Frequency Network) area.

9. The method of claim 1,
wherein the UE is in an RRC connected state, and
wherein the estimation for mobility is estimation for triggering a measurement result report.

10. The method of claim 9,
further comprising transmitting the measurement result report to the network, based on the estimation for triggering the measurement result report.

11. The method of claim 1,
wherein the UE is a RRC idle state, and
wherein the estimation for mobility is to set a priority for cell selection.

12. The method of claim 11, further comprising performing the cell selection by the UE, based on the priority for the cell selection.

13. A user equipment (UE), the UE comprising:
a radio frequency (RF) unit configured to transmit and receive a radio signal; and
a processor operatively coupled to the RF unit,
wherein the processor configured to:
receive MBMS cell list information including at least one MBMS cell list from a network;
receive offset information including at least one offset from the network;
apply the at least one offset to a plurality of cells providing at least one MBMS service of interest; and
perform estimation for mobility by applying the at least one offset,
wherein the MBMS cell list information further includes information on MBMS services provided by cells of the at least one MBMS cell list,
wherein the plurality of cells are included in the cells of the at least one MBMS cell list,
wherein each of the MBMS services, including the at least one MBMS service of interest, is provided, by the network, in a unit of MBMS cell list, and
wherein the at least one offset is MBMS service-specific.

* * * * *